United States Patent
Oh

(10) Patent No.: US 8,577,068 B2
(45) Date of Patent: *Nov. 5, 2013

(54) POP-UP TWEETER

(75) Inventor: Se Min Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 51 days.

This patent is subject to a terminal disclaimer.

(21) Appl. No.: 13/172,288

(22) Filed: Jun. 29, 2011

(65) Prior Publication Data

US 2012/0128194 A1    May 24, 2012

(30) Foreign Application Priority Data

Nov. 24, 2010   (KR) .................. 10-2010-0117741

(51) Int. Cl.
*H04R 1/02*   (2006.01)
(52) U.S. Cl.
USPC ............................. 381/334; 381/333; 381/335
(58) Field of Classification Search
USPC .................. 381/386, 333, 334, 335
See application file for complete search history.

(56) References Cited

U.S. PATENT DOCUMENTS

| 7,748,515 B2 * | 7/2010 | Hishioka et al. ........... 198/347.1 |
| 7,869,903 B2 * | 1/2011 | Turner et al. .................. 700/275 |
| 2007/0140508 A1 | 6/2007 | Soerensen |

FOREIGN PATENT DOCUMENTS

| KR | U1998-052458 | 10/1998 |
| KR | 10-2005-0007730 | 1/2005 |
| KR | 1020050007730 | * 1/2005 |
| KR | 10-0850983 | 8/2008 |

* cited by examiner

*Primary Examiner* — Davetta W Goins
*Assistant Examiner* — Amir Etesam
(74) *Attorney, Agent, or Firm* — Edwards Wildman Palmer LLP; Peter F. Corless

(57) ABSTRACT

The present invention relates to a pop-up tweeter. In particular, the pop-up tweeter includes a casing, a driving unit inserted into the inside of the casing. The driving unit is configured to be movable upward and downward within the casing along with a speaker. The pop-up tweeter is installed within a vehicle and is configured to have an opening and closing structure which advantageously improves user convenience and provides an external design of a speaker with increased merchantability.

1 Claim, 2 Drawing Sheets

POP-UP TWEETER

CROSS-REFERENCE TO RELATED APPLICATION

Priority to Korean patent application number 10-2010-0117741, filed on Nov. 24, 2010, which is incorporated by reference in its entirety herein, is claimed

BACKGROUND OF THE INVENTION

1. Field of the Invention

The present invention relates to a pop-up tweeter and, more particularly, to a pop-up tweeter which is capable of improving an external design of a speaker mounted on a vehicle and has an opening and closing structure according to use.

2. Background of the Invention

In general, audio systems installed in a vehicle allow a user to listen to broadcasting and music in the vehicle. These audio systems chiefly includes an antenna, a media source (i.e., a radio tuner, a cassette, and a CD), units for sound waves and audio frequency amplification, speakers, and so on.

The speakers are the major elements of the audio system because they determine the performance of room acoustics in the vehicle. In order to enjoy stereo music, different kinds of speakers, such as a woofer speaker responsible for a range of a mid-bass band and tweeters responsible for a range of a high band are typically utilized.

One form of tweeter outputs a range of a high band, having a short wavelength and a strong direction characteristic. The characteristic of sound quality of the audio system is greatly changed according to the output direction of each of the tweeters in the vehicle respectively.

Accordingly, the conventional tweeters are generally installed in the inside covers of side mirrors provided in front doors on both sides of the vehicle so that the output directions are oriented toward the center of a driver's seat and a passenger seat.

However, the tweeters applied to an audio system for a vehicle are fixed so that they output sound only in the initially designed direction. Accordingly, these tweeters cannot provide optimized sound quality according to the position of a main listener in alternative directions. Furthermore, a driver's seat and a passenger seat can enjoy optimized sound quality only at specific positions because the output directions of the tweeters are installed towards the center of the driver's seat and the passenger seat. Thus, when the driver or passengers are not seated accordingly, the audio effect is lessened.

BRIEF SUMMARY OF THE INVENTION

An embodiment of the present invention relates to a pop-up tweeter that improves an external design of a speaker mounted on a vehicle and enables an opening and closing structure according to use.

More specifically, the pop-up tweeter according to the present invention includes a casing, a driving unit inserted into the inside of the casing and configured to be movable upward and downward, and a speaker mounted on a top of the driving unit and configured to be movable upward and downward.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
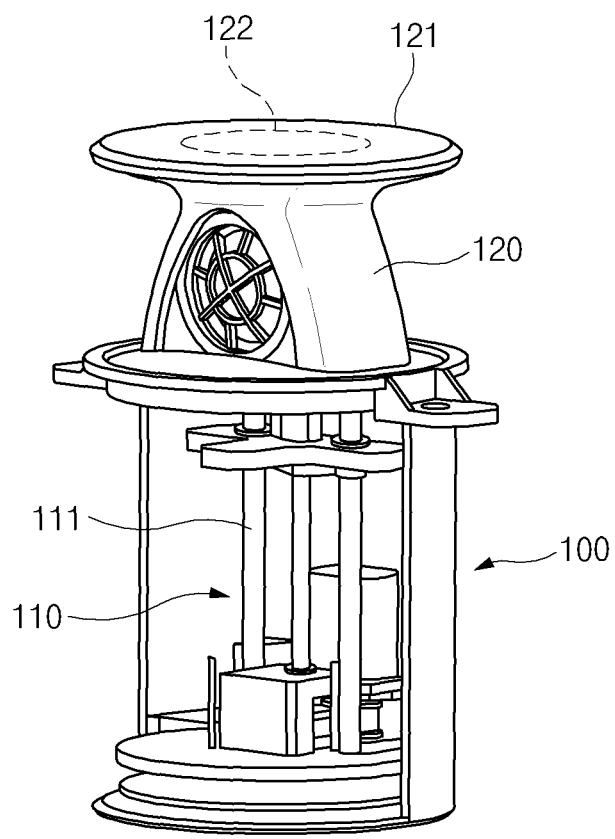
FIG. 1 is a diagram showing a pop-up tweeter according to an exemplary embodiment of the present invention.

100: casing
110: driving unit
111: multi-stage shaft
120: speaker
121: cover unit
122: sensor It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF EMBODIMENT

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Note that it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
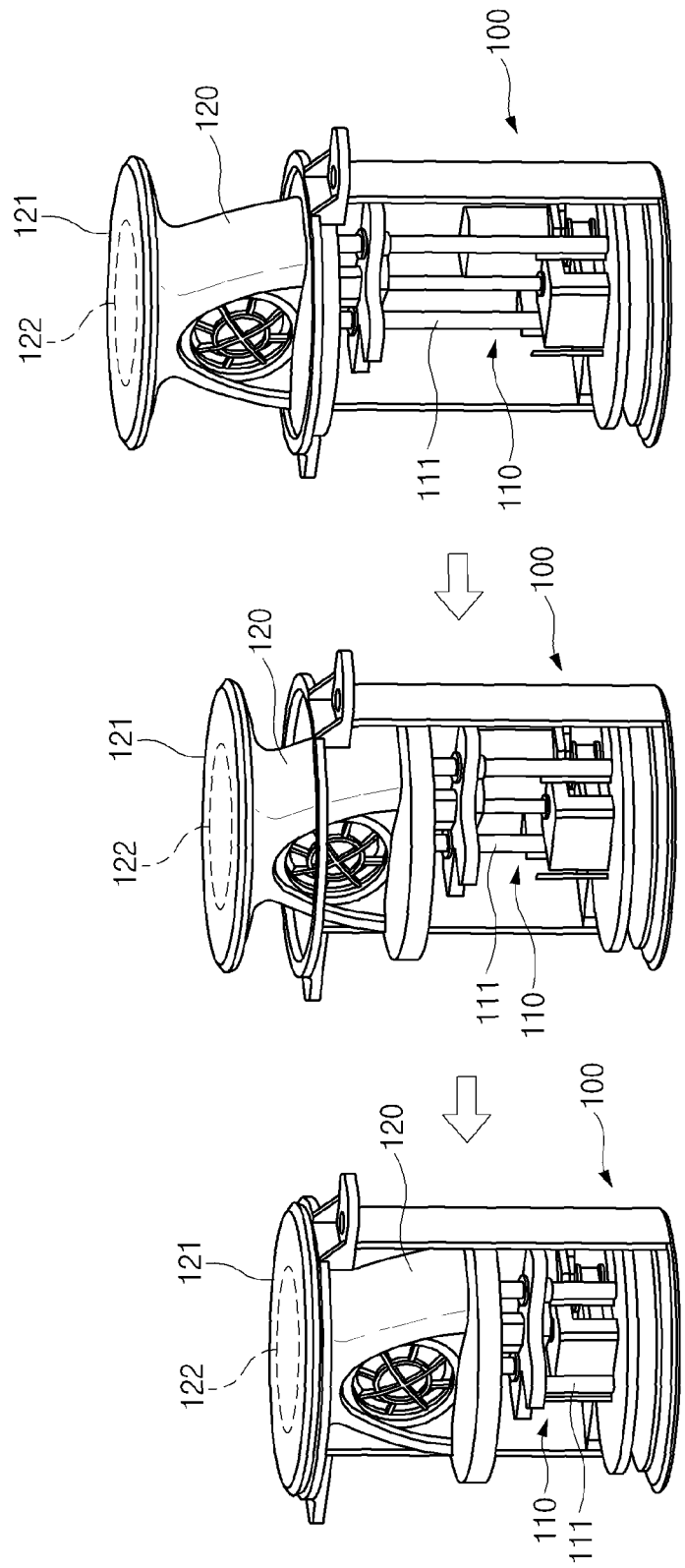
FIG. 2 is a diagram showing the state in which the pop-up tweeter of which the exemplary embodiment of the present invention is operated.

FIGS. 1 and 2 relate to a pop-up tweeter of the present invention. FIG. 1 is a diagram showing the pop-up tweeter according to the present invention, and FIG. 2 is a diagram showing the state in which the pop-up tweeter of the present invention is operated.

An embodiment of the present invention will be described in detail below with reference to the accompanying drawings.

The pop-up tweeter of the present invention, as shown in FIGS. 1 and 2, includes a driving unit 110 disposed within a cylindrical casing 100 and configured to be movable upward and downward and a speaker 120 mounted on a top of the driving unit 110. In this configuration, when a user touches a cover unit 121 provided on a top of the speaker 120 in order to open or shut the speaker 120, the driving unit 110 slides upward or downward. Accordingly, user convenience can be improved.

In the present invention, as shown in FIGS. 1 and 2, the speaker 120 is slidably mounted within the casing 100. The casing 100 has a cylindrical shape and is installed within, e.g., a panel, such as a dashboard, a door, or a tray which are provided in the inside of a vehicle.

The driving unit 110 is inserted into the inside of the casing 100 and is configured to move upward and downward. Here, the driving unit 110 has a slidable structure which may be moved upward in an opened state and moved downward in a closed state. Advantageously, the length of a multi-stage shaft 111 of a telescopic shape can be changed upward or downward by means of the rotation of a motor (not shown).

The speaker 120 is mounted on a top of the driving unit 110 and configured to move upward and downward when the driving unit 110 is operated. Accordingly, when a user wants the speaker 120 to be opened, the driving unit 110 moves upward, and thus the speaker 120 protrudes outside the casing 100. When a user wants the speaker 120 to be closed, the driving unit 110 moves downward, and thus the speaker 120 is inserted into the inside of the casing 100.

Furthermore, the speaker 120 is connected to a power unit (not shown) provided within the vehicle. When the speaker 120 is moved upward and opened, the speaker 120 is automatically turned on. When the speaker 120 is moved downward and closed, the speaker 120 is automatically turned off.

Meanwhile, the cover unit 121 of a forming shape is formed on the top of the speaker 120. Accordingly, during the up and down sliding operations according to the operation of the driving unit 110, when the cover unit 121 of the speaker 120 moves downward, the cover unit 121 is caught in the top of the casing 100. Accordingly, the speaker 120 is prevented form being fully inserted into the casing 100.

Illustratively, a sensor 122 is mounted on an upper inside surface of the cover unit 121 and is operated in conjunction with the driving unit 110. Accordingly, it is preferred that when the sensor 122 detects a user' touch on the cover unit 121, the upward or downward sliding operation of the driving unit 110 is performed. Accordingly, the sensor 122 may be a pressure sensor or a field sensor capable of detecting touch generated in the cover unit 121.

The operation and effects of the present invention are described below and shown in FIG. 2.

As shown in FIGS. 1 and 2, the driving unit 110 movable upward and downward is provided within the casing 100 of a cylindrical shape, and the speaker 120 is mounted on the top of the driving unit 110. When a user touches the cover unit 121 provided on the top of the speaker 120 in order to open the speaker 120, the upward or downward sliding operation of the driving unit 110 is performed through the sensor 122 provided in the inside of the cover unit 121.

Through the above configuration, when a user wants the speaker 120 to be opened, the driving unit 110 moves upward, and thus the speaker 120 is protruded outside the casing 100. Accordingly, the speaker 120 is automatically turned on. When a user wants the speaker 120 to be closed, the driving unit 110 moves downward, and thus the speaker 120 is inserted into the casing 100. Accordingly, when the speaker 120 is automatically turned off. Consequently, user convenience can be maximized, and an external design can be improved.

The pop-up tweeter of the present invention, constructed as described above, includes the casing, the driving unit inserted into the inside of the casing and configured to be movable upward and downward. Additionally, the speaker is mounted on the top of the driving unit and configured to be movable upward and downward. The pop-up tweeter is installed within a vehicle and is configured to have the opening and closing structure. Accordingly, the present invention advantageously improves a user's convenience and provides an external design of a speaker with increased merchantability.

Although a specific embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A pop-up tweeter, comprising:
   a casing;
   a driving unit inserted into an inside of the casing and configured to be movable upward and downward within the casing wherein the driving unit has a sliding structure and a length of a multistage shaft having a telescopic shape is changed to move the driving unit upward or downward;
   a speaker mounted on a top of the driving unit and configured to be movable upward and downward within the casing,
   wherein in an opened state, the driving unit is moved upward and the speaker is protruded outside the casing, and in a closed state, the driving unit is moved downward and the speaker is inserted into the casing;
   a cover unit having a shape formed on a top of the speaker so that when the cover unit is closed, the cover unit is seated on the casing; and
   a sensor installed within the cover unit, wherein the sensor is operated in conjunction with the driving unit so that when the sensor detects touch on the cover unit, slides the pop-up tweeter into the opened state.

* * * * *